US008209603B2

(12) United States Patent
Bailor et al.

(10) Patent No.: US 8,209,603 B2
(45) Date of Patent: Jun. 26, 2012

(54) MAINTAINING UNDO AND REDO CAPABILITY ACROSS METADATA MERGES

(75) Inventors: Jonathan B. Bailor, Bellevue, WA (US); Edgar Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 12/431,883

(22) Filed: Apr. 29, 2009

(65) Prior Publication Data
US 2010/0281362 A1 Nov. 4, 2010

(51) Int. Cl.
*G06F 17/24* (2006.01)
*G06F 17/25* (2006.01)
(52) U.S. Cl. ........................ 715/255; 711/132
(58) Field of Classification Search .................. 715/255; 711/132
See application file for complete search history.

(56) References Cited

U.S. PATENT DOCUMENTS

| 5,479,601 | A | 12/1995 | Matheny |
| 5,524,205 | A | 6/1996 | Lomet |
| 5,890,181 | A * | 3/1999 | Selesky et al. ............... 715/255 |
| 6,067,551 | A | 5/2000 | Brown |
| 6,192,378 | B1 | 2/2001 | Abrams |
| 7,096,465 | B1 | 8/2006 | Dardinski |
| 7,107,294 | B2 * | 9/2006 | Romanufa et al. .................... 1/1 |
| 7,155,666 | B2 * | 12/2006 | Breuer et al. ................. 715/255 |
| 7,499,955 | B2 * | 3/2009 | Kao et al. ............................... 1/1 |
| 2002/0065848 | A1 * | 5/2002 | Walker et al. ................. 707/511 |
| 2004/0054643 | A1 * | 3/2004 | Vemuri et al. ..................... 707/1 |
| 2004/0054644 | A1 * | 3/2004 | Ganesh et al. ..................... 707/1 |
| 2004/0205663 | A1 * | 10/2004 | Mohamed ..................... 715/530 |
| 2008/0134161 | A1 | 6/2008 | Chamieh |
| 2008/0172607 | A1 | 7/2008 | Baer |
| 2008/0177994 | A1 | 7/2008 | Mayer |
| 2008/0189646 | A1 * | 8/2008 | Bohle ........................... 715/781 |
| 2009/0006946 | A1 | 1/2009 | Hanson |

OTHER PUBLICATIONS

Preston et al.,"Simulation-based Architectural Design and Implementation of a Real-time Collaborative Editing System" Society for Computer Simulation International, 2007, pp. 320-327.*
Heer et al., "Graphical Histories for Visualization: Supporting Analysis, Communication and Evaluation", 2008, ACM, pp. 1-8.*
"Undo" accessed at http://www.cgl.uwaterloo.ca/~lank/HCI/s08/11.pdf, on Feb. 19, 2009, 33 pages.

(Continued)

*Primary Examiner* — Doug Hutton, Jr.
*Assistant Examiner* — James Debrow
(74) *Attorney, Agent, or Firm* — Merchant & Gould P.C.

(57) ABSTRACT

A method is presented for preserving metadata during an undo operation at a client computer. A first section of a document is modified on a word processing application on the client computer by performing one or more user actions in the first section of the document. While modifying the first section of the document, metadata is received at the client computer for a second section of the document. The metadata is inserted into the second section of the document. After the metadata is inserted into the second section of the document, an undo operation is performed on the word processing application. The undo operation includes the steps of removing the metadata from the second section of the document, undoing the last user action of the one or more user actions in the first section of the document and restoring the metadata for the second section of the document.

18 Claims, 5 Drawing Sheets

OTHER PUBLICATIONS

Chi et al., "Bringing Collaborative Editing of Open Document Format (ODF) Documents to the Web," IBM®, IBM Research, accessed at http://assets.expecnation.com/15/event/2/Bringing%20Collaborative%20Editing%20of%20Open%20Document%20Format%20_ODF_%20Documents%20to%20the%20Web%20Presentation.ppt, on Feb. 19, 2009, 31 pages.

Heer et al., "Graphical Histories for Visualization: Supporting Analysis, Communication, and Evaluation," Mar. 31, 2008, 8 pages.

Payne, Donna, "Metadata: the Good, the Bad, and the Ugly," Law Office Computing, Feb./Mar. 2004, pp. 78-83.

Zepko, Tom, "Undo/Redo in Controls," Cocoa Programming, Resources for Cocoa Programmers, accessed at http://homepage.mac.com/tom$_{13}$ zepko/cocoa/topics/undo-redo.html, on Feb. 20, 2009, 4 pages.

U.S. Appl. No. 12/145,536, filed Jun. 25, 2008.

International Search Report and Written Opinion issued in PCT/US2010/031951, mailed Nov. 16, 2010 (Non-M&G 326733-02).

\* cited by examiner

US 8,209,603 B2

MAINTAINING UNDO AND REDO CAPABILITY ACROSS METADATA MERGES

BACKGROUND

Online document collaboration systems can support coauthoring of documents. Coauthoring permits multiple users to access the same document, make changes in the document and merge the changes at the document collaboration system. Difficulties can arise when different users are editing the same part of a document.

For example, two users may make changes to the same part of a document, and the system must reconcile these changes when merging the modifications into a single document. Further, variances can occur when a user attempts to revert to a previous state of a document when other users have modified the document in the interim. This can result in unexpected behaviors when, for example, a user attempts to undo changes that the user has made to a coauthored document.

SUMMARY

Embodiments of the disclosure are directed to preserving metadata during an undo operation at a client computer. A first section of a document is modified on a word processing application on a client computer. Modifying the first section of the document comprises performing one or more user actions in the first section of the document. While modifying the first section of the document, metadata is received at the client computer for a second section of the document. The second section of the document is different than the first section of the document. After receiving the metadata for the second section of the document, the metadata is inserted into the second section of the document.

After the metadata is inserted into the second section of the document, an undo operation is performed on the word processing application. The undo operation includes the steps of removing the metadata from the second section of the document, undoing the last user action of the one or more user actions in the first section of the document and restoring the metadata for the second section of the document.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for maintaining undo/redo capability across metadata merges in a document that is coauthored. A coauthored document is a document that multiple users can access and modify at the same time.

In some examples described herein, the undo/redo capability is maintained across metadata merges. A metadata merge occurs when metadata, typically a paragraph lock from another coauthoring user, is inserted into the document. The systems and methods disclose the use of a state-based undo/redo stack that stores user actions and that also stores metadata. The systems and methods effectively permit the metadata stored on the stack to be skipped so that the undo/redo capability is not affected by a metadata merge.

Figure 1:
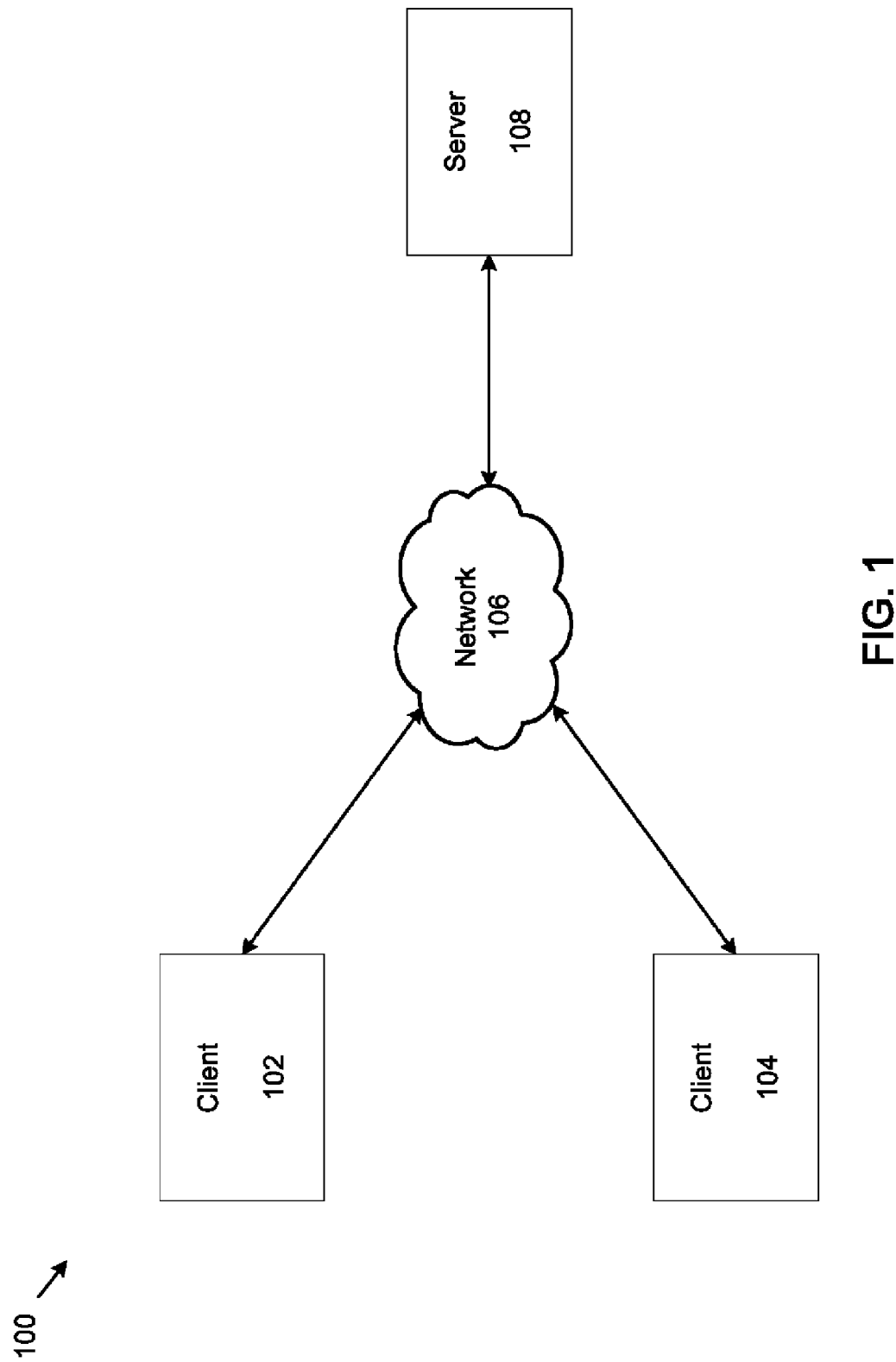
FIG. 1 shows an example system for maintaining undo/redo capability in a document across metadata merges.

FIG. 1 shows an example system 100 for maintaining undo/redo capability in a document across metadata merges. The example system 100 includes clients 102 and 104, network 106 and server 108. Greater or fewer clients, servers, and networks can be used. In this disclosure, the terms client and client computer are used interchangeably, and the terms server and server computer are used interchangeably.

In example embodiments, clients 102 and 104 are computing devices, as described further below.

Among the plurality of information stored by clients 102, 104 is a client operating system ("OS") and client applications. The client OS is a program that manages the hardware and software resources of the client system. The client applications utilize the resources of the clients 102, 104 to directly perform tasks specified by the user. For example, the clients 102, 104 include one or more software applications, such as word processing programs, that are used to create and edit document files. One example of such an application is the Microsoft Word word processing application from Microsoft Corporation of Redmond, Wash. Other examples of such applications are also applicable.

In example embodiments, network 106 is a Local Area Network (LAN), a Wide Area Network (WAN) or the Internet. Clients 102 and 104 can access server 108 and resources connected to server 108 remotely.

Example server 108 typically includes an operating system suitable for controlling the operation of a networked computer, such as the WINDOWS® operating systems from Microsoft Corporation of Redmond, Wash. or a server, such as Windows Server 2008, also from Microsoft Corporation of Redmond, Wash.

In an example embodiment, the example system 100 is an online, browser-based document collaboration system. An example of an online, browser-based document collaboration system is the SHAREPOINT® team services software from Microsoft Corporation of Redmond, Wash. In example system 100, server 108 is a Microsoft SharePoint server, for example Microsoft Office SharePoint Server 2007 from Microsoft Corporation of Redmond, Wash.

In example embodiments, clients 102 and 104 may coauthor a document stored on server 108. An example document includes one or more sections. Each section of the document is typically a paragraph. However, the section can be any subpart of a document, for example sentences, paragraphs, headings, drawings, tables, etc. A document may contain only one section, for example a single table, sentence, or multiple sections, such as multiple tables, sentences, or paragraphs. For the example embodiment disclosed herein, a document section is a paragraph of the document.

When a coauthoring user at client 102 types in a paragraph of the document, example client 102 sends metadata regarding the paragraph to server 108. The metadata is typically in the form of a paragraph lock, indicating that client 102 has locked the paragraph being edited. In one example, the paragraph is identified as being edited when the user make a modification to the paragraph. In another example, the paragraph is identified as being edited when the user places the cursor in the paragraph. The example client locks the paragraph being edited because only one coauthoring user is permitted to edit a specific paragraph of a document at the same time.

When the server 108 receives the metadata from client 102, server 108 identifies all other coauthoring users that may have the document open. Server 108 transmits the metadata to the identified coauthoring users. For example, if a coauthoring user on example client 104 has the document opened, server 108 inserts the metadata into the document opened by the coauthoring user on client 104.

In example embodiments, server 108 inserts a paragraph lock into the paragraph of the document opened by the coauthoring user on client 104 that corresponds to the paragraph being edited by the coauthoring user on client 102. The lock prevents the coauthoring user on client 104 from editing the paragraph in which the lock is inserted. However, the coauthoring user on client 104 may edit any other paragraph in the document that has not been locked. The coauthoring user on client 104 may also create one or more new paragraphs in the document opened on client 104 and edit those paragraphs.

During the course of editing on client 104, the coauthoring user may wish to undo a user action. For example, the coauthoring user may have typed an incorrect key or may have made a formatting change that the coauthoring user may wish to undo or the coauthoring user may have performed a cut and paste operation that the coauthoring user may wish to undo. Other user actions that a coauthoring user may wish to undo are possible.

Additional examples of undo operations are described in U.S. Pat. No. 7,499,955, filed Mar. 30, 2005 and in U.S. patent application Ser. No. 11/623,234, filed Jan. 15, 2007, both of which are incorporated herein by reference.

One way for the coauthoring user on example client 104 to undo a user action is to perform an undo operation, for example by pressing an example undo key on client 104. Typically, an undo operation undoes the last action and reverts the document to the previous action. For example, if the coauthoring user types the letters "t" "h" and "e" in the document, pressing an example undo key on example 104 deletes the last action (for example the typing of the letter "e") so that the document contains the letters "t" and "h" after the undo operation.

User actions are typically saved on a program stack, for example an undo/redo stack, in order to permit the user actions to be undone. For example, if a user typed the letter "t" the letter "t" would be stored on the undo/redo stack. Then when the letter "h" is typed, the letter "h" is stored on the undo/redo stack and when the letter "e" is typed, the letter "e" is stored on the undo/redo stack. In example embodiments, the actual letter may not be stored on a stack. Instead a pointer to an area in memory may be stored. The area in memory may contain the actual letter.

Program stacks, for example the undo/redo stack, operate in a last in/first out basis. For the example above, the letter "e" is first off the stack because the letter "e" was the last of the three letters stored on the stack. During an example undo operation, the letter "e" is popped off the stack, leaving the letter "h" on the top of the stack.

Metadata locks are also stored on the example undo/redo stack. If a user is typing in a paragraph, each letter that the user types is sequentially stored on the undo/redo stack. However, if a metadata lock is received while a user is typing, the lock is also stored on the undo/redo stack. The reason the lock is stored on the undo/redo stack is because in word processing applications like Microsoft Word, the undo/redo stack typically stores every action, including locks. It is therefore desirable that, when the user performs an undo operation, the lock is typically preserved instead of being discarded since the lock is located at the top of the undo/redo stack. This results in undo/redo behavior that is expected by the user. That is, the user typically expects the undo operation to undo the last user action and not to remove any locks in the document.

In order to preserve a paragraph lock during an undo operation, in example embodiments, when an undo operation occurs, the paragraph lock is removed from the undo/redo stack and temporarily stored in memory on the client computer. Then the user action stored at the top of the undo/redo stack is undone. After the user action stored at the top of the undo/redo stack is undone, the paragraph lock is obtained from memory and stored back onto the stack. In this manner, from a user perspective, the undo operation proceeds as expected and the lock is maintained in the document.

Figure 2:
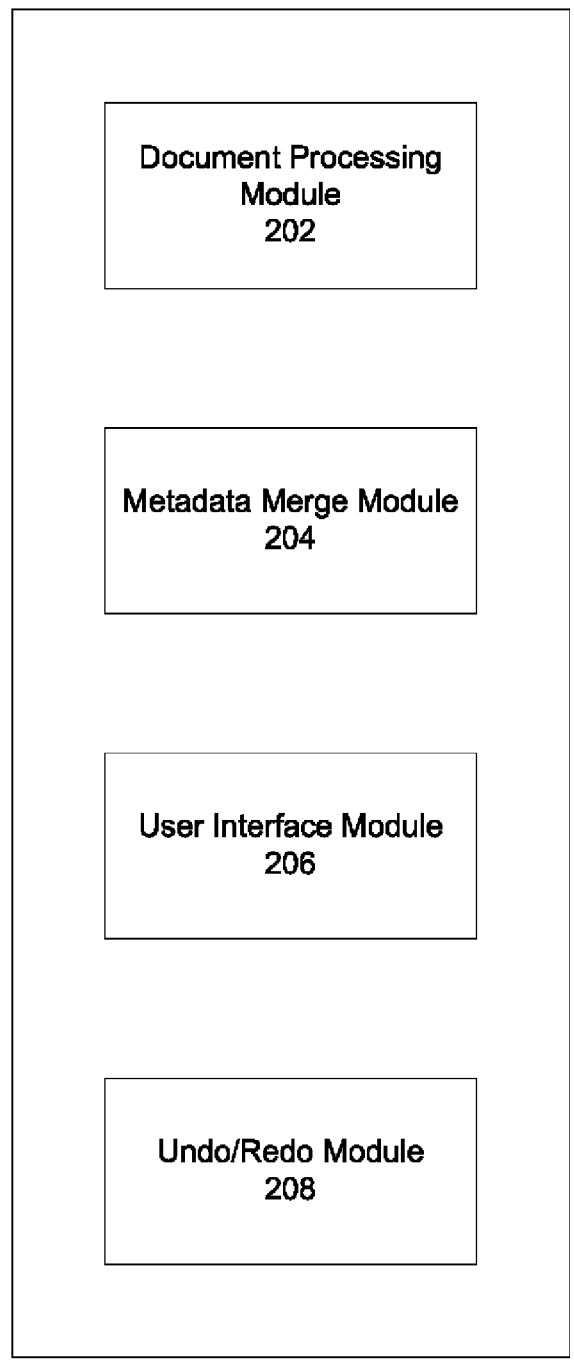
FIG. 2 shows example modules of an example client computer of FIG. 1 that implements a capability for maintaining undo/redo capability in a document across metadata merges.

FIG. 2 shows example modules on example client 102. The example client 102 includes example data processing module 202, example metadata merge module 204, example user interface module 206 and example undo/redo module 208. The example data processing module 202 comprises a word processing program such as the Microsoft Word word processing application from Microsoft Corporation of Redmond, Wash.

The example metadata merge module 204, processes metadata received from example server 108 and inserts the metadata into appropriate sections of documents open on client computer 102. Typically, the metadata represents locks on sections of a document being edited by other coauthoring users. When the example metadata merge module 204, receives a lock from server 108 for a specific section of the document, the example metadata merge module 204 inserts the lock into the corresponding section of the document open on client computer 102. The lock prevents the coauthoring user on client 102 from editing the section of the document for which the lock is directed. In example embodiments, a section of a document corresponds to a paragraph of the document. In other example embodiments, the granularity of document sections may vary, as described above.

The example user interface module 206 receives the lock from the example metadata merge module 204 and displays the lock in the appropriate section of the document. For example, the example user interface module 206 may put a bracket around a paragraph to indicate that the paragraph is locked. As another example, the example user interface module may insert an icon representing a lock next to the paragraph to be locked. Additionally, the example user interface module may display the name of the user that is coauthoring the paragraph. Other examples are possible. When a user sees a graphical indication that a paragraph is locked, the user is informed that editing in that paragraph is disabled until such time that the lock is removed.

Additional details regarding such locks can be found in U.S. patent application Ser. No. 12/145,536 filed on Jun. 25, 2008, the entirety of which is hereby incorporated by reference. Other configurations are possible.

The example undo/redo module 208 processes undo and redo requests and performs undo and redo operations in a document while maintaining the integrity of any metadata locks in the document. The example undo/redo module 208 includes an example undo/redo stack. The example undo/redo stack includes an undo section and a redo section. Whereas, traditional program stacks push entries onto the stack and pop entries off the stack, the example undo/redo stack provides a marker to a specific portion of the undo/redo stack. User actions and metadata locks are stored or removed from the undo/redo stack in relation to where the marker is pointing in the undo/redo stack. As discussed, in example embodiments, the example undo/stack may store pointers to user actions and pointers to metadata locks.

When an undo request is received, the example undo/redo module 208 checks the undo/redo stack on client computer 102 and removes any metadata locks from the undo portion of the undo/redo stack. All metadata locks removed from the undo portion of the undo/redo stack are then temporarily stored in memory on client computer 102. The last user action is then removed from the undo/redo stack and the last user action is reverted. For example if the last user action was to bold a character, the undo operation removes the bolding from the character.

After the undo operation is completed, the example undo/redo module 208 retrieves the locks temporarily stored in memory and restores the locks to the undo/redo stack. The example undo/redo module restores the locks in the reverse order to which the locks were removed from the undo/redo stack. For example, if there two locks were removed from the undo/redo stack, the second lock removed is restored to the stack first and the first lock removed is restored to the stack next. The locks on the stack are then in the same order as before the last user action was removed from the undo/redo stack. Thus, the locks are restored while minimizing any negative impact to the user experience, such as non-responsiveness or erratic user interface behavior.

The undo/redo stack also permits undo operations to be redone. For example, if a user action is removed from undo section of the undo/redo stack as a result of an undo operation, the user action is stored in the redo portion of the undo/redo stack. If it is determined that an undo operation is to be reversed, for example by pressing an example redo button on the example client computer 102, the user action is removed from the redo portion of the undo/redo stack and restored to the document and to the undo portion of the undo/redo stack. For example, if the undo operation removed the letter "e" from the document, the redo operation restores the letter "e". In addition, the redo operation restores the letter "e" to the undo portion of the undo/redo stack.

Figure 3:
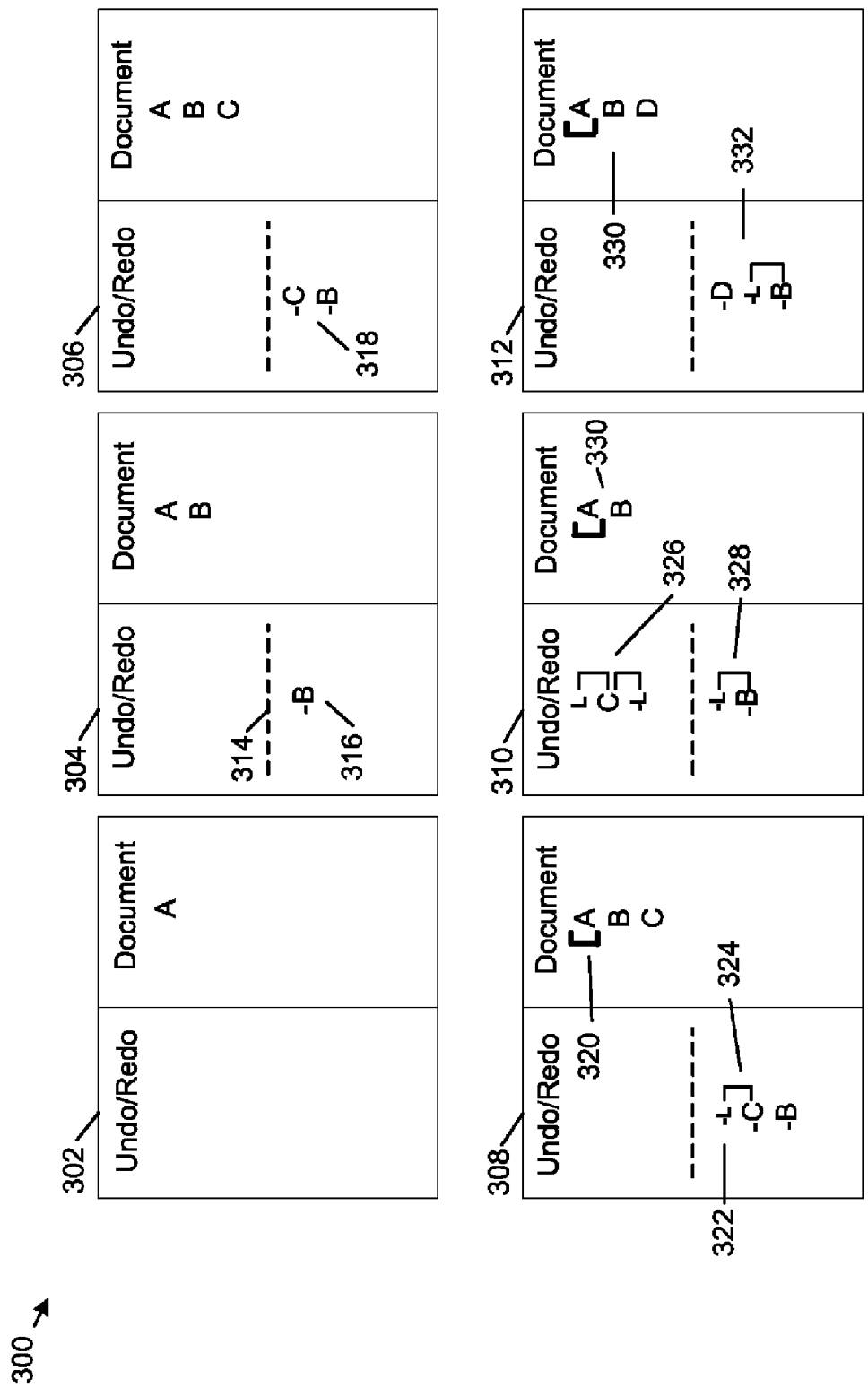
FIG. 3 shows example time snapshots of an example undo/redo stack.

FIG. 3 shows an example undo/redo stack and an example document at time snapshots of a user editing session. In the example illustrations, each letter represents the content of a specific paragraph, for example paragraphs A, B, C and D.

At time snapshot 302, a user opens a document that contains content in paragraph A. No edits have been made so the example undo/redo stack is empty.

At time snapshot 304, the user creates content for paragraph B. The example undo/redo stack shows a horizontal line 314 that shows a demarcation between the redo portion of the example undo/redo stack and the undo portion of the example undo/redo stack. The undo portion of the example undo/redo stack is the bottom portion 316. At time snapshot 304, the bottom portion 316 of the example undo/redo stack shows "–B". The "–B" represents undo actions for paragraph B. Each user action made in example paragraph B is represented by the symbol "–B". For example, if a user typed only typed the characters "T" "h" and "e" in paragraph B, each character is inserted into the undo/redo stack in the order typed, first "T" then "h" and then "e". For simplicity all these actions are represented by the symbol "–B".

At time snapshot 306, the user creates content for paragraph C. Accordingly, the document section of snapshot 306 shows that the document now has content in paragraphs A, B and C. In addition, the symbol "–C" is added to the bottom portion of the undo/redo stack 318.

At time snapshot 308, a lock is received at example client computer 102 for paragraph A as a result of a metadata merge. The lock is represented by lock symbol 320 around paragraph A. The lock is metadata representing that a coauthoring user on a client system, for example client computer 104, is editing paragraph A. When the lock is received at client computer 102, the lock is also added to the undo section of the undo/redo stack. This is represented by example lock symbol 322. The lock 322 is also shown bracketed, via bracket 324, around the previous entry "–C" in the undo portion of the undo/redo stack. The reason the lock is shown bracketed around the previous entry "–C" is to emphasize the state of the document before the metadata merge.

At time snapshot 310, a user at example client computer 102 decides to perform an undo operation to undo the last entry made in paragraph C. When the undo operation is performed, the example undo/redo module 208 temporarily removes the lock in the example document 330, performs the undo operation for the last entry made in paragraph C and then reinserts the lock in the example document 330. These actions are added to the redo portion 326 of the example undo/redo stack. The actions are added to the redo portion 326 of the example undo/redo stack so that the actions can be reverted, if necessary, by a redo operation.

The example redo portion 326 of the example undo/redo stack shows that to redo the undo action for the last entry made to paragraph C, going from bottom to top of the example redo portion 326 of the example undo/redo stack, first the current lock is removed (indicated by the symbol "–L"), then the last entry to paragraph C is reinserted into paragraph C and then the lock is reinserted in the document (indicated by the symbol "L").

Time snapshot 310 also shows that after the undo operation for paragraph C, the example document 330 includes paragraphs A and B. This assumes, for simplicity that the undo operation for paragraph C removes all the text in paragraph C. Time snapshot 310 also shows that after the last user action in paragraph C is undone, the redo portion of the example undo/redo stack 328 shows a lock and the last user action of paragraph B. This indicates that the next undo operation is setup to temporarily remove the lock and undo the last user action of paragraph B.

At time snapshot 312, the user at example client computer 102 starts typing in a new paragraph D. Whenever a user starts a new action, the redo portion of the undo/redo stack is cleared. This is because, once a new action is initiated, the previous undo operation can no longer be reverted. For example, if a user typed "t" "h" and "s", then did an undo operation for the "s" and then typed "e", if the redo stack isn't cleared when the "e" is typed, a redo operation would restore the "s", resulting in "t" "h" "e" "s", clearly not what was intended.

The example document portion 330 of time snapshot 312 shows that paragraph D has been added to the document. The example undo portion 332 of the example undo/redo stack for time snapshot 312 shows the symbol "–D" being added. Because paragraph D is created after the lock on paragraph A is received, the last user action for paragraph D can be undone without first removing the lock. However, if the last user action for paragraph D is redone, in order for the last user action for paragraph A to be undone, the lock on the example document 330 must be temporarily removed, as discussed.

Figure 4:
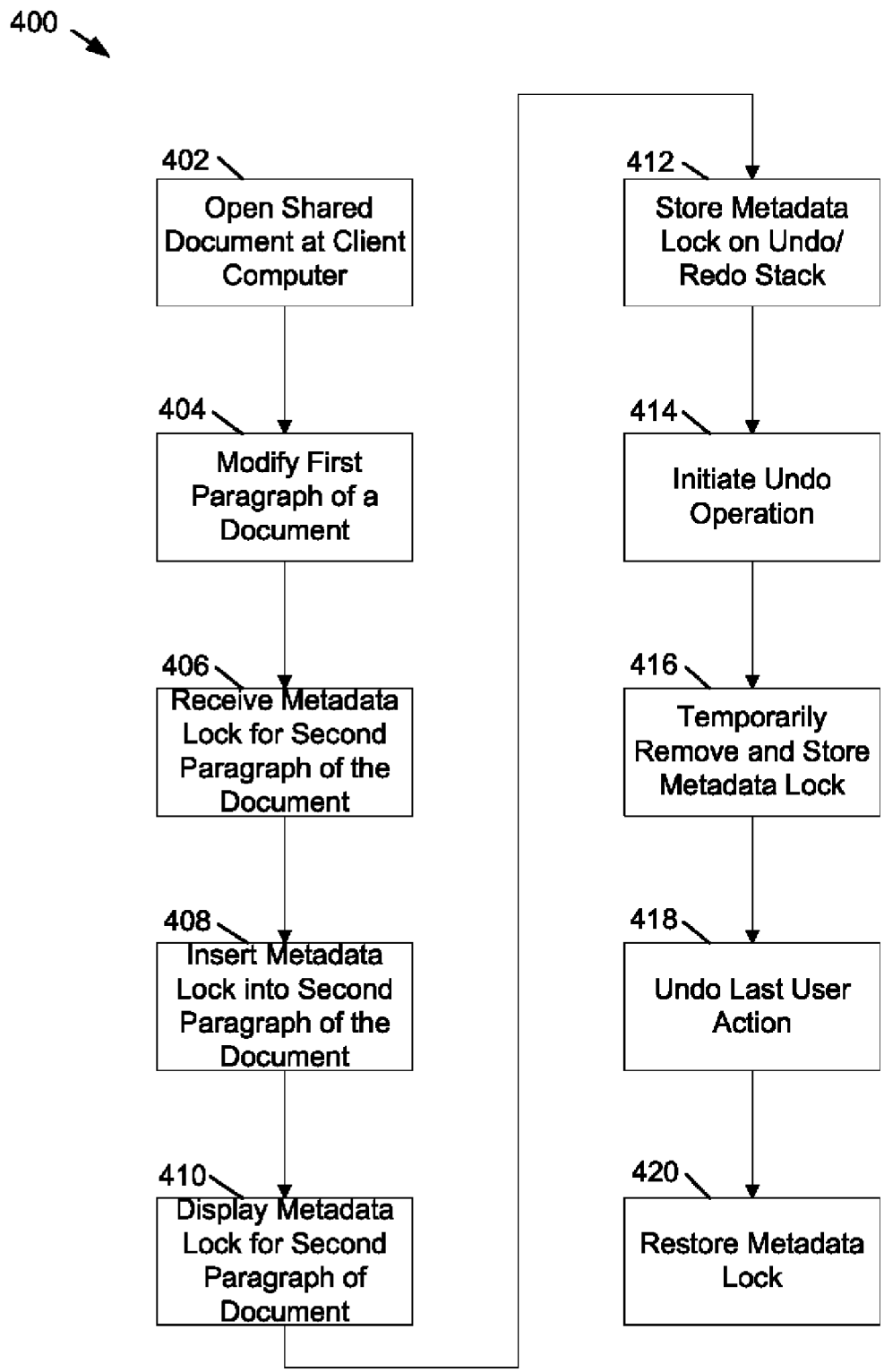
FIG. 4 shows a flow chart of an example undo operation performed at an example client computer.

FIG. 4 shows a flowchart illustrating an example operation 400 performed by example client computer 102. At operation 402 a shared document is opened at example client computer 102. The shared document is one that is stored on an online browser-based document collaboration server, for example Microsoft SharePoint Server 2007. The shared document is also available for coauthoring by other users, for example a user on example client computer 104. The shared document is opened and processed using the example document processing module 202.

At operation 404, a coauthoring user on client computer 102 modifies a first paragraph of the document. The user can modify the first paragraph by typing in the first paragraph, deleting part of the first paragraph or making formatting changes in the first paragraph. Typing in the first paragraph includes creating the first paragraph and editing text in the first paragraph.

At operation 406, the example metadata merge module 204 on client computer 102 receives a metadata lock for a second paragraph of the document. At operation 408, the example metadata merge module 204 inserts the metadata lock in the second paragraph of the document. The metadata lock indicates that a coauthoring user on another client system, for client computer 104, is modifying the second paragraph of the document. The metadata lock prevents the user on client computer 102 from modifying the second paragraph of the document.

At operation 410, the example user interface module 206 displays the metadata lock in graphical form on the document so the coauthoring user on client 102 can quickly see what paragraphs of the document are locked. At operation 412, the example metadata merge module 204 stores the metadata lock on the undo/redo stack on client computer 102.

At operation 414, the coauthoring user on client computer 102 initiates an undo operation. For example, the coauthoring user on client computer 102 may wish to undo the last user action in the first paragraph of the document. The undo operation is processed by example undo/redo module 208. The last user action is an editing action that may include typing a character, deleting part of the first paragraph and making formatting changes in the first paragraph. The user typically initiates the undo operation by pressing a key on client computer 102 associated with the undo operation, for example by pressing an undo key.

At operation 416, the example metadata merge module 204 removes the metadata lock on the undo/redo stack and temporarily stores the metadata lock in memory, in an area other than the undo/redo stack, on the example client computer 102. At operation 418, the last user action is undone and at operation 420, the example metadata merge module 204 restores the metadata lock on the undo/redo stack.

Figure 5:
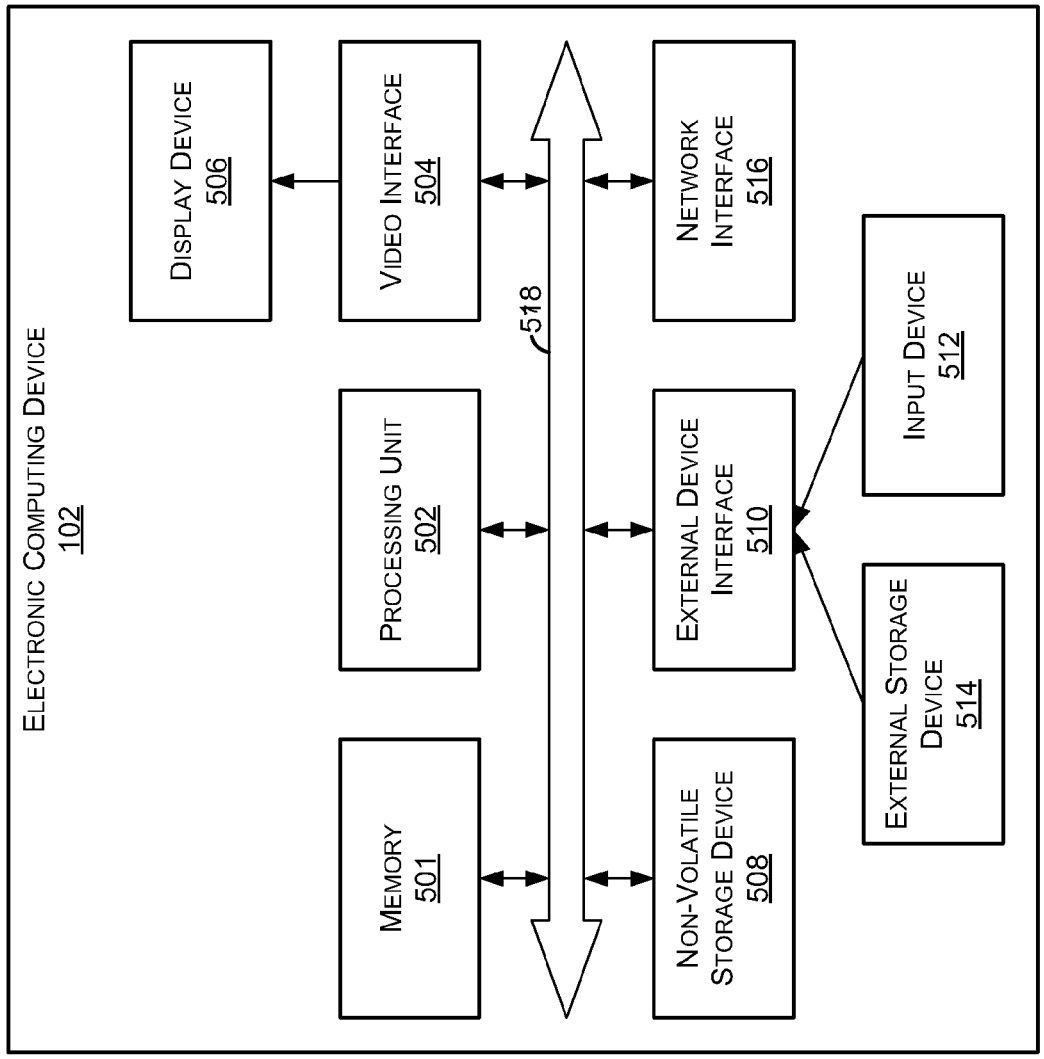
FIG. 5 shows the example client computer of FIG. 2 that implements maintaining undo/redo capability in a document across metadata merges.

FIG. 5 is a block diagram illustrating example physical components on client 102. Client computer 104 and server computer 108 and/or electronic computing devices within client computers 102 and 104 and/or server computer 108 may be implemented in a manner similar to that of client 102.

As illustrated in the example of FIG. 5, client 102 is an electronic computing device such as a desktop computer, laptop computer, terminal computer, personal data assistant, or cellular telephone device.

Client including a memory unit 501. Memory unit 501 is a computer-readable data storage medium that is capable of storing data and instructions. Memory unit 501 may be a variety of different types of computer-readable data storage media including, but not limited to, dynamic random access memory (DRAM), double data rate synchronous dynamic random access memory (DDR SDRAM), reduced latency DRAM, DDR SDRAM, DDR3 SDRAM, Rambus RAM, or other types of computer-readable data storage media.

Client 102 can also include communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

In addition, client 102 includes a processing unit 502. In a first example, processing unit 502 may execute software instructions that cause processing unit 502 to provide specific functionality. In this first example, processing unit 502 may be implemented as one or more processing cores and/or as one or more separate microprocessors. For instance, in this first example, processing unit 502 may be implemented as one or more Intel Core2 microprocessors. Processing unit 502 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 502 may be implemented as an application specific integrated circuit (ASIC) that provides specific functionality. In a third example, processing unit 502 may provide specific functionality by using an ASIC and by executing software instructions.

Client 102 also comprises a video interface 504 that enables a client computer (102 and 104) or a server computer 108 to output video information to display device 506. Display device 506 may be a variety of different types of display devices. For instance, display device 506 may be a cathode-ray tube display, an LCD display panel, a plasma screen display panel, a touch-sensitive display panel, a LED array, or another type of display device.

In addition, client 102 includes a non-volatile storage device 508. Non-volatile storage device 508 is a computer-readable data storage medium that is capable of storage data and/or instructions. Non-volatile storage device 508 may be a variety of different types of different non-volatile storage devices. For example, non-volatile storage device 508 may be one or more hard disk drives, magnetic tape drives, CD-ROM drives, DVD-ROM drives, Blu-Ray disc drives, or other types on non-volatile storage devices.

Client 102 also includes an external component interface 510 that enables client computers 102 and 104 and server computer 108 to communicate with external components. As illustrated in the example of FIG. 5, external component interface 510 communicates with an input device 512 and an external storage device 514. In one implementation of client 102, external component interface 510 is a Universal Serial Bus (USB) interface. In other implementations of client 102, client 102 may include another type of interface that enables client 102 to communicate with input device and/or output devices. For instance, client 102 may include a PS/2 interface. Input device 512 may be a variety of different types of devices including, but not limited to keyboards, mice, trackballs, stylus input devices, touch pads, touch-sensitive display devices, touch-sensitive display screens, or other types of input devices. External storage device 514 may be a variety of different types of computer-readable data storage media including magnetic tape, flash memory modules, magnetic disk drives, optical disc drives, and other computer-readable data storage media.

In addition, client 102 includes a network interface 516 that enables client 102 to send data to and receive data from network 106. Network interface 516 may be a variety of different types of network interface. For example, network interface 516 may be an Ethernet interface, a token-ring interface, a fiber optic interface, a wireless network interface (e.g. WiFi, WiMax, etc.), or another type of network interface.

Client 102 also includes a communications medium 518 that facilitates communication among the various components of client 102. Communications medium 518 may comprise one or more different types of communication media including, but not limited to, a PCI bus, a PCI Express bus, an accelerated graphics port (AGP) bus, an Infiniband interconnect, a serial Advanced Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 5 (i.e. memory unit 501, non-volatile storage device 508, and external storage device 514). Together, these computer-readable data storage media may constitute a single logical computer-readable data storage medium. This single logical computer-readable data storage medium may store instructions executable by processing unit 502. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 502, to perform the action.

The various embodiments described above are provided by way of illustration only and should not be construed to limiting. Various modifications and changes that may be made to the embodiments described above without departing from the true spirit and scope of the disclosure.

What is claimed is:

1. A method for preserving metadata during an undo operation at a client computer, the method comprising:
    modifying, at the client computer, a first section of a document on a word processing application on a client computer, the modifying a first section of a document comprising performing one or more user actions in the first section of the document;
    while modifying the first section of the document, receiving metadata, at the client computer, for a second section of the document, the second section of the document being different than the first section of the document;
    after receiving the metadata for the second section of the document, inserting the metadata in the second section of the document; and
    after the metadata is inserted in the second section of the document, performing an undo operation on the word processing application, wherein the undo operation includes the steps of:
        removing the metadata, at the client computer, for the second section of the document;
        undoing the last user action of the one or more user actions in the first section of the document; and
        restoring the metadata for the second section of the document
        wherein removing the metadata at the client computer for the second section of the document comprises removing the metadata from a program stack and storing the metadata in an area of memory on the client computer that is different from the program stack.

2. The method of claim 1, wherein the metadata received at the client computer for the second section of the document is a lock for the second section of the document.

3. The method of claim 1, wherein the first section of the document corresponds to a paragraph in the document.

4. The method of claim 1, further comprising storing the received metadata for the second section of the document in a program stack.

5. The method of claim 4, wherein the program stack is an undo/redo stack.

6. The method of claim 4, wherein the one or more user actions are saved on the program stack.

7. The method of claim 4, wherein undoing the last user action comprises removing the last user action from the program stack.

8. The method of claim 7, wherein restoring the metadata for the second section of the document comprises obtaining the metadata from the area of memory on the client computer that is different from the program stack and storing the obtained metadata on the program stack.

9. The method of claim 1, wherein the one or more user actions include typing in the first section of the document, formatting changes in the first section of the document, and deleting text in the first section of the document.

10. The method of claim 1, wherein the first section of the document corresponds to a first paragraph in the document that a first user is editing, and the second section of the document corresponds to a second paragraph that a second user is editing.

11. The method of claim 10, further comprising sending a first lock that prevents the second user from modifying the first paragraph.

12. The method of claim 11, further comprising receiving a second lock that presents the first user from modifying the second paragraph.

13. A computing device, comprising:
    a processing unit;
    a system memory connected to the processing unit, the system memory comprising instructions that, when executed by the processing unit, cause the processing unit to create:
        a document processing module that permits a user to create and edit documents on the computing device;
        a metadata merge module that receives metadata from a server computer and inserts the metadata into one or more sections of a document opened by the document processing module;
        a undo/redo module that stores one or more user actions and that stores metadata received from the server computer, the undo/redo module including an undo/redo stack, the metadata and user actions being stored on the undo/redo stack, the undo/redo module permitting a user to undo the one or more user actions by removing the metadata from one or more sections of the document before undoing a user action, and reinserting the removed metadata into the one or more sections of the document after undoing the user action; and
        a user interface module that displays on a document metadata received from a server computer,
        wherein the undo/redo module removes the metadata from the undo/redo stack and stores the metadata in an area of memory on the client computer that is different from the undo/redo stack.

14. The computing device of claim 13, wherein the one or more sections of a document are paragraphs.

15. The computing device of claim 14, wherein the metadata are locks, the locks preventing a user from writing to the one or more sections of the document to which the locks are inserted.

16. The computing device of claim 13, wherein the metadata are locks, the locks preventing a user from writing to the one or more sections of the document to which the locks are inserted.

17. The computing device of claim 13, wherein the undo/redo module further includes a redo program stack, the redo program stack storing one or more user actions and metadata, the redo program stack permitting an undo operation on a user action to be reversed while still maintaining the integrity of the metadata in the document.

18. A computer-readable storage medium comprising instructions that, when executed by a processing unit of a client computer, cause the processing unit of the client computer to:
   edit a first paragraph of a document on the client computer, the first paragraph being edited by a user on the client computer, the editing of the first paragraph of the document comprising one or more user actions in the first paragraph of the document, the one or more user actions including typing in the first paragraph, deleting text in the first paragraph, making style changes in the first paragraph and formatting the first paragraph, the one or more user actions in the first paragraph of the document being stored on a undo/redo stack on the client computer;
   while editing the first paragraph of the document, receive a lock at the client computer for a second paragraph of the document, the lock being received from a server computer, the lock indicating that another user on a second client computer is currently editing the second paragraph of the document, and the lock preventing the user from editing the second paragraph;
   after receiving the lock for the second paragraph of the document, cause the processing unit of the client computer to:
      insert the lock in the second paragraph of the document, the lock preventing the user on the first client computer from editing the second paragraph on the first client computer;
      store the lock on the undo/redo stack of the client computer; and
      after storing the lock on the undo/redo stack of the client computer, perform an undo operation at the client computer, wherein the undo operation causes the processing unit on the first client computer to:
         remove the lock for the second paragraph of the document from the undo/redo stack at the first client computer;
         when the lock is removed from the undo/redo stack at the client computer, temporarily store the lock in memory on the first client computer, the lock being stored in an area of memory not including the undo/redo stack;
         when the lock is removed from the undo/redo stack at the first client computer, undo the last of the one or more user actions at the first client computer, the last of the one or more user actions being removed from the undo/redo stack; and
         after the last of the one or more user actions is undone at the first client computer, remove the lock from the area of memory on the first client computer in which the lock is temporarily stored and restore the lock on the undo/redo stack.

* * * * *